United States Patent
Cai et al.

(10) Patent No.: US 8,786,146 B2
(45) Date of Patent: Jul. 22, 2014

(54) ELECTRIC MACHINE AND OIL COOLING METHOD FOR ELECTRICAL MACHINE

(75) Inventors: Wei Cai, Beijing (CN); Yi Zheng, Beijing (CN); Xinglian Yuan, Beijing (CN)

(73) Assignee: Jing-Jin Electric Technologies (Beijing) Co., Ltd., Beijing (CN)

( * ) Notice: Subject to any disclaimer, the term of this patent is extended or adjusted under 35 U.S.C. 154(b) by 91 days.

(21) Appl. No.: 13/513,019

(22) PCT Filed: Jan. 26, 2010

(86) PCT No.: PCT/CN2010/000119
§ 371 (c)(1),
(2), (4) Date: May 31, 2012

(87) PCT Pub. No.: WO2011/069313
PCT Pub. Date: Jun. 16, 2011

(65) Prior Publication Data
US 2012/0235521 A1 Sep. 20, 2012

(30) Foreign Application Priority Data
Dec. 8, 2009 (CN) .......................... 2009 1 0252069

(51) Int. Cl.
*H02K 9/20* (2006.01)
(52) U.S. Cl.
USPC ............................................ 310/54; 310/260
(58) Field of Classification Search
USPC ......................................... 310/52, 54, 58, 260
See application file for complete search history.

(56) References Cited

U.S. PATENT DOCUMENTS

| 2,873,393 | A | * | 2/1959 | Baudry | 310/55 |
| 3,648,085 | A | * | 3/1972 | Fujii | 310/54 |
| 3,870,907 | A | * | 3/1975 | Hoffman | 310/64 |
| 4,517,479 | A | * | 5/1985 | Aleem et al. | 310/54 |
| 5,363,002 | A | * | 11/1994 | Hernden et al. | 310/54 |
| 5,682,074 | A | * | 10/1997 | Di Pietro et al. | 310/215 |
| 6,489,697 | B1 | | 12/2002 | Ozawa et al. | |
| 7,834,492 | B2 | * | 11/2010 | Iund et al. | 310/52 |
| 8,110,952 | B2 | * | 2/2012 | Wakita | 310/54 |
| 8,169,110 | B2 | * | 5/2012 | Swales et al. | 310/54 |

FOREIGN PATENT DOCUMENTS

| CN | 2400961 Y | 10/2000 |
| GB | 162552 A | 5/1921 |
| JP | 58215956 A | 12/1983 |
| JP | 2009071923 A | 4/2009 |
| JP | 2009284603 A | 12/2009 |

* cited by examiner

*Primary Examiner* — Dang Le
(74) *Attorney, Agent, or Firm* — Boyle Fredrickson, S.C.

(57) ABSTRACT

An electrical machine including a casing (1), an oil inlet hole (7), an oil passage (2), oil outlet holes (3), a stator retainer (8), a casing end cover (10), a stator iron core (5), winding coils (6), slot insulations (12) and oil-guides (4). The oil passage (2) is located inside the casing (1) and links with the oil inlet hole (7) of the casing (1) and the oil outlet holes (3) of the stator retainer (8). The oil outlet holes (3) are located above the winding coils (6) and the oil-guides (4) are located between the oil outlet holes (3) and the winding coils (6). Oil entering from the oil inlet hole (7) pours onto the winding coils (6) by the guidance of the oil-guides (4) after flowing through the oil passage (2) and flowing out of the oil outlet holes (3). The winding coils of the electrical machine can be effectively cooled and the electrical machine can achieve higher thermal durability. An oil cooling method for the electrical machine is also provided.

12 Claims, 6 Drawing Sheets

ELECTRIC MACHINE AND OIL COOLING METHOD FOR ELECTRICAL MACHINE

FIELD OF THE INVENTION

The present invention relates to technology of mechanical manufacture and in particular, an electrical machine and an oil cooling method for electrical machine.

BACKGROUND OF THE INVENTION

In the prior art, winding coils in the electrical machine are cooled with cooling oil. In most of the oil passage designs for cooling winding coils in the electrical machine, there are often a number of 90-degree corners in the oil passage from the oil inlet hole to the oil outlet hole, causing the cooling oil to lose pressure. Thus, the cooling oil will not be sprayed onto the winding coils from the oil outlet hole but naturally flow out by gravity.

FIG. 1 is a schematic diagram of the housing and stator assembly of the electrical machine in the prior art. As shown in FIG. 1, a number of winding coils 6 are arranged along the internal arc line of the housing 11 of the electrical machine. FIG. 1 does not show a casing end cover.

FIG. 2 is a sectional view taken along a line AA' shown in FIG. 1. As shown in FIG. 2, the housing 11 of the electrical machine comprises: a casing 1, an oil inlet hole 7, oil passages 2 (guiding passage of the cooling oil), oil outlet holes 3, a stator retainer 8 and a casing end cover 10. The electrical machine shown in FIG. 2 further comprises a stator assembly connected to the housing and formed by a stator iron core 5, winding coils 6 and slot insulations. In the sectional view of FIG. 2, the slot insulations cannot be seen as they are not drawn therein. In addition, FIG. 2 show the path taken by the cooling oil from the oil inlet hole 7 through the oil passage 2 to the oil outlet holes 3 indicated by arrows.

FIG. 3 is a sectional view taken along a line BB' shown in FIG. 2. FIG. 3 shows a casing 1, an oil passage 2, oil outlet holes 3, winding coils 6, a stator retainer 8 and slot insulations 12, indicated by arrows the path along which the cooling oil flows from the oil inlet hole 7 through the oil passage 2 to the oil outlet holes 3 and meanwhile indicates the path along which the cooling oil loses along the circumferential wall of the housing due to surface tension effects. This is because at an oil outlet hole located in a certain angle of the circumference, the oil when flowing out of the oil outlet hole may flow along the circumferential wall of the housing and the casing end cover due to the surface tension of the oil instead of pouring/spraying directly onto the winding coils.

At present, in some designs, grooves are provided below the winding coils. These grooves may accumulate some oil for the purpose of cooling the winding coils by immersing them into the oil. However, it is not easy to mount and manufacture these grooves, especially to ensure that the coils should not be touched when mounting the grooves so as to prevent from destroying the insulation of the coils. Furthermore, as the bottom of the coils is usually very close to the air gap of the electrical machine, the grooves should not affect the space of the air gap, either. In addition, after having cooled the top winding coil, the cooling oil that is heated by taking heat from said winding coil will flow along the circumferential grooves into the next winding coil to cool it, and so on. This leads to uneven cooling on every winding coil.

In conclusion, the cooling efficiency is not high in the existing solutions for cooling the winding coils of the electrical machine, leading to poor thermal durability of the electrical machine.

SUMMARY OF THE INVENTION

The present invention also provides an electrical machine, which can cool its own winding coils more effectively and increase its thermal durability.

The present invention also provides an oil cooling method for electrical machine, which can cool the winding coils of the electrical machine more effectively such that the electrical machine has a high thermal durability.

To achieve the above purposes, the technical solution of the present invention is carried out as follows:

The present invention discloses an electrical machine, comprising: a house and a stator assembly;

the housing comprising: a casing (1), an oil inlet hole (7), an oil passage (2), oil outlet holes (3), a stator retainer (8) and a casing end cover (10); wherein the oil inlet hole (7) is located in the casing (1), the oil outlet holes (3) are located in the stator retainer (8), and the oil passage (2) is located inside the casing (1) and links with the oil inlet hole (7) and the oil outlet holes (3);

the stator assembly comprising: a stator iron core (5), winding coils (6) and slot insulations (12); the oil outlet holes (3) are located above the winding coils (6);

the electrical machine further comprises oil-guides located between the oil outlet holes (3) and the winding coils (6);

cooling oil entering from the oil inlet hole (7) pours onto the winding coils (6) by the guidance of the oil-guides after flowing through the oil passage (2) and flowing out of the oil outlet holes (3).

The oil-guides are fixed to the stator retainer (8);

or, the oil-guides are casted with the stator retainer (8) as one piece.

The stator retainer (8) is fixed to the casing (1), or, the stator retainer (8) is casted with the casing (1) as one piece;

or, the stator retainer (8) is fixed to the casing end cover (10), or, the stator retainer (8) is casted with the casing end cover (10) as one piece.

The shape of the oil-guides is: cylindrical, or V-shaped, or semicircular, or semi-elliptical, or three-side rectangular.

A number of oil outlet holes (3) are distributed in the circumferential wall of the stator retainer (8), sequentially downwards from a top end of the stator retainer (8), hole diameters of the oil outlet holes (3) increase sequentially.

The present invention further discloses an oil cooling method for electrical machine, which is suitable for the electrical machine comprising a housing and a stator assembly;

the housing comprising: a casing (1), an oil inlet hole (7), an oil passage (2), oil outlet holes (3), a stator retainer (8) and a casing end cover (10); wherein the oil inlet hole (7) is located in the casing (1), the oil outlet holes (3) are located in the stator retainer (8), and the oil passage (2) is located inside the casing (1) and links with the oil inlet hole (7) and the oil outlet holes (3);

the stator assembly comprising: a stator iron core (5), winding coils (6) and slot insulations (12); the oil outlet holes (3) are located above the winding coils (6);

the method comprising: providing oil-guides between the oil outlet holes (3) and the winding coils (6); and guiding cooling oil flowing out of the oil outlet holes (3) by the oil-guides to pour onto the winding coils (6) when the cooling oil enters from the oil inlet hole (7), flows through the oil passage (2) and then flows out of the oil outlet holes (3).

Fixing the oil-guides to the stator retainer (8);

or, casting the oil-guides and the stator retainer (8) as one piece.

Fixing the stator retainer (8) on the casing (1), or, casting the stator retainer (8) and the casing (1) as one piece;

or, fixing the stator retainer (8) to the casing end cover (10), or, casting the stator retainer (8) and the casing end cover (10) as one piece.

The shape of the oil-guides is: cylindrical, or V-shaped, or semicircular, or semi-elliptical, or three-side rectangular.

A number of oil outlet holes (3) are distributed in the circumferential wall of the stator retainer (8), sequentially downwards from the top end of the stator retainer (8), hole diameters of the oil outlet holes (3) increase sequentially.

It can be seen from the above technical solution that the technical solution of the present invention, i.e., providing oil-guides between the oil outlet holes and the winding coils of the electrical machine, and guiding cooling oil flowing out of the oil outlet holes by the oil-guides to pour onto the winding coils when the cooling oil enters from the oil inlet hole, flows through the oil passage and then flows out of the oil outlet holes, avoids the loss of the cooling oil along the circumferential wall of the housing and the casing end cover due to surface tension after the cooling oil flows out of the oil outlet holes, and allows the cooling oil to pour directly on the winding coils such that the winding coils can be evenly cooled. This greatly enhances the cooling efficiency of the winding coils of the electrical machine, thereby improving the thermal durability of the electrical machine.

DETAILED DESCRIPTION OF THE PREFERRED EMBODIMENT

The core idea of the present invention is: to additionally provide in the electrical machine oil-guides guiding the cooling oil to flow to the winding coils such that the cooling oil pours directly onto the winding coils under the action of the oil-guides instead of losing along the circumferential wall of the housing and the casing end cover.

In order to make the purpose, technical solution and benefits of the present invention more clear, the present invention will be described in more detail hereinbelow with reference to the drawings and the detailed embodiments.

Figure 1:
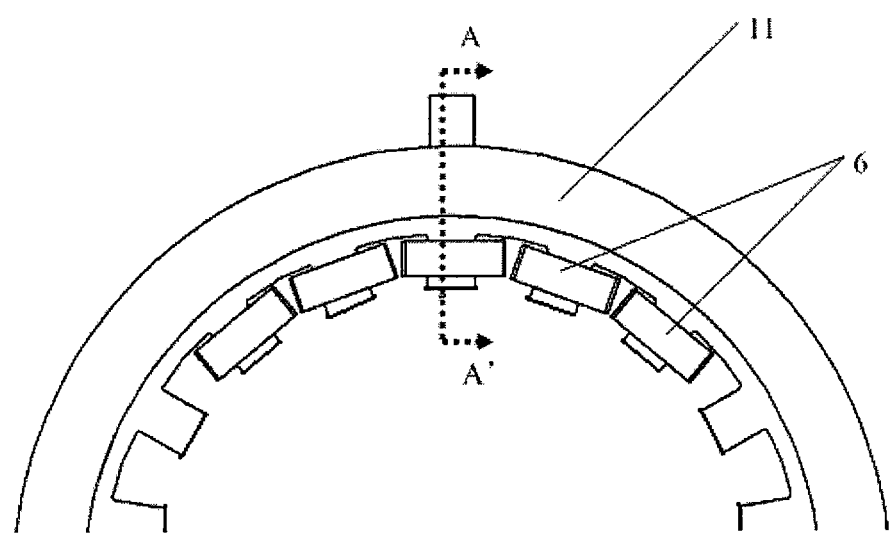
FIG. 1 is a schematic diagram of the housing and stator assembly of the electrical machine in the prior art.
Figure 2:
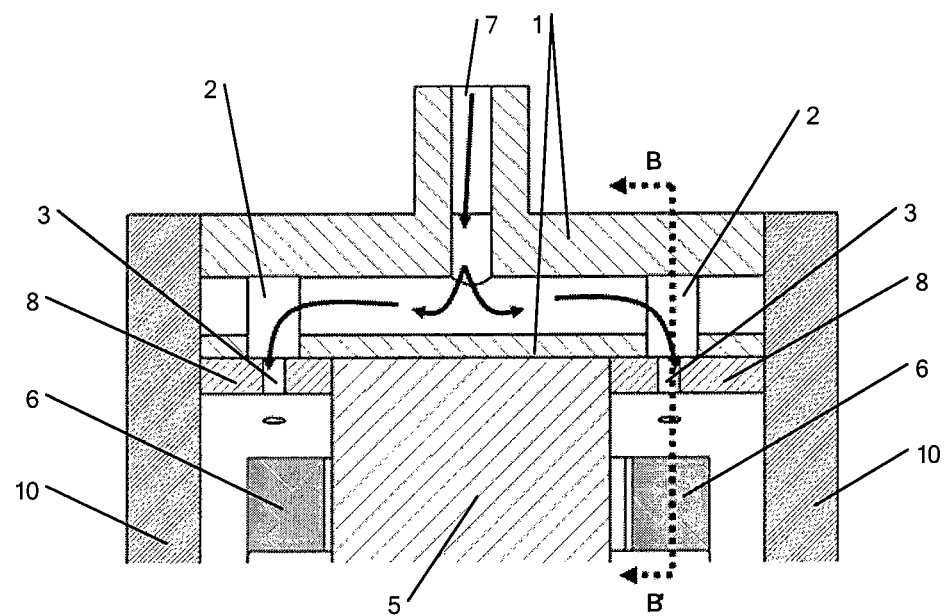
FIG. 2 is a sectional view taken along a line AA' shown in FIG. 1.
Figure 3:
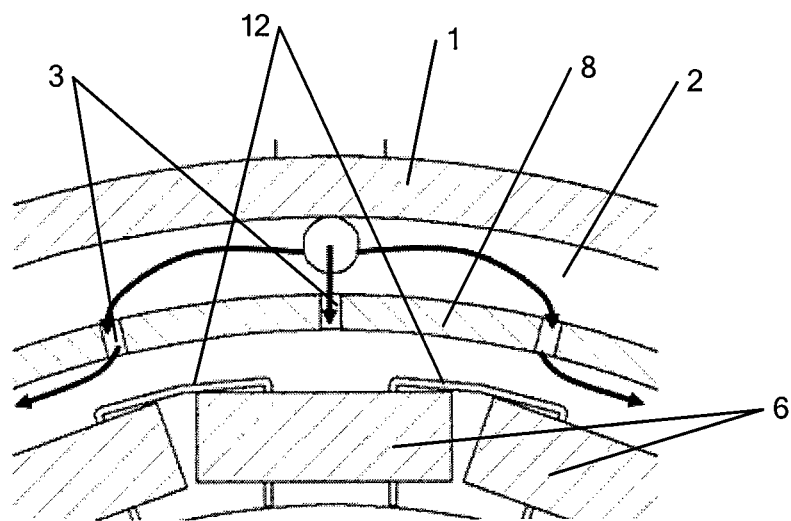
FIG. 3 is a sectional view taken along a line BB' shown in FIG. 2.
Figure 4:
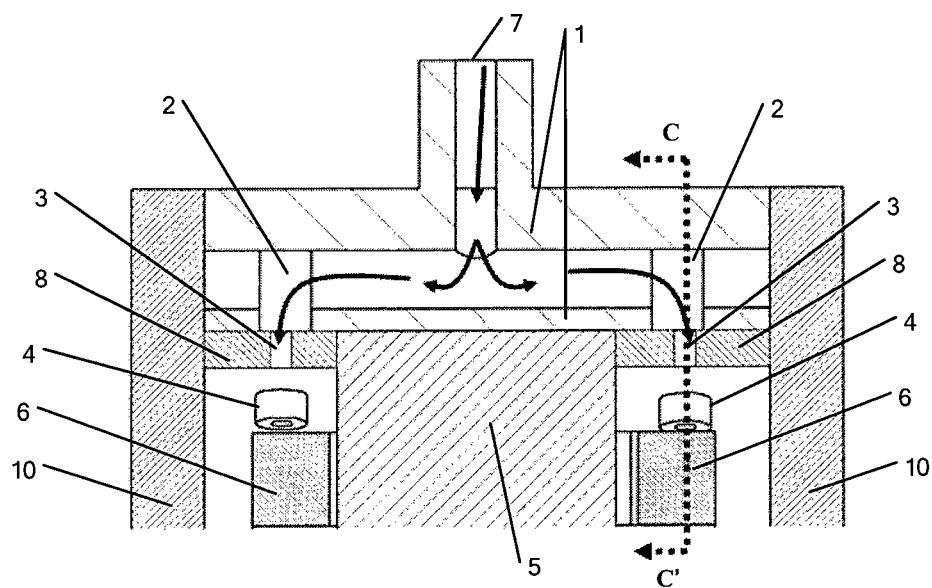
FIG. 4 is a schematic diagram of a first embodiment of the electrical machine in the present invention.

FIG. 4 is a schematic diagram of a first embodiment of the electrical machine in the present invention. FIG. 4 is a sectional view taken along a line AA' shown in FIG. 1. Referring to FIG. 4, the electrical machine comprises: a housing and a stator assembly. Wherein the housing comprises: a casing 1, an oil inlet hole 7, an oil passage 2, oil outlet holes 3, a stator retainer 8 and a casing end cover 10; wherein the oil inlet hole 7 is located in the casing 1, the oil outlet holes 3 are located in the stator retainer 8, and the oil passage 2 is located inside the casing 1 and links with the oil inlet hole 7 and the oil outlet holes 3. The stator assembly comprises: a stator iron core 5, winding coils 6 and slot insulations 12; here, the slot insulations 12 cannot be seen in the sectional view of FIG. 4, but the position thereof will be shown in the succeeding FIG. 5; the oil outlet holes 3 are located above the winding coils 6. The above structure is the same with the prior art.

In the embodiment of the present invention, the electrical machine shown in FIG. 4 further comprises oil-guides 4 located between the oil outlet holes 3 and the winding coils 6. In the embodiment shown in FIG. 4, the oil-guides 4 are in a cylindrical shape. Thus, after flowing through the oil passage 2 and then flowing out of the oil outlet holes 3, the cooling oil entering from the oil inlet hole 7 pours directly onto the winding coils 6 by the guiding of the cylindrical oil-guides 4 after flowing out along the cavity of the oil-guides 4, instead of losing along the circumferential wall of the housing.

In the embodiment shown in FIG. 4, the cylindrical oil guides 4 may be fixed to the stator retainer 8, or, the cylindrical oil-guides 4 may also be casted with the stator retainer 8 as one piece. Here, the stator retainer 8 may be fixed to the casing 1, or, the stator retainer 8 may also be casted with the casing 1 as one piece. In addition, the stator retainer 8 may also be fixed to the casing end cover 10, or, the stator retainer 8 may also be casted with the casing end cover 10 as one piece.

In the embodiment shown in FIG. 4, the oil passage 2 is formed by trenching, drilling, or casting within the casing 1.

Figure 5:
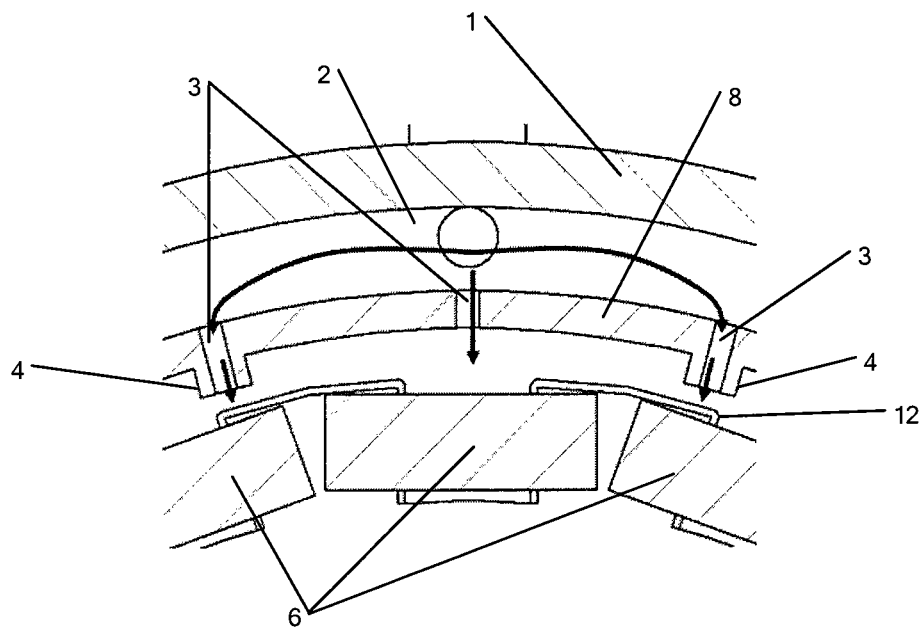
FIG. 5 is a sectional view taken along a line CC' shown in FIG. 4.

FIG. 5 is a sectional view taken along the line CC' shown in FIG. 4. FIG. 5 shows the slot insulations 12 that FIG. 4 fails to show, and indicates with arrows the passage along which the cooling oil flows from the oil inlet hole 7 through the oil passage 2 to the oil outlet holes 3 and the passage along which the cooling oil flows from the outlet holes 3 through the cylindrical oil-guides 4 to the winding coils.

Figure 12:
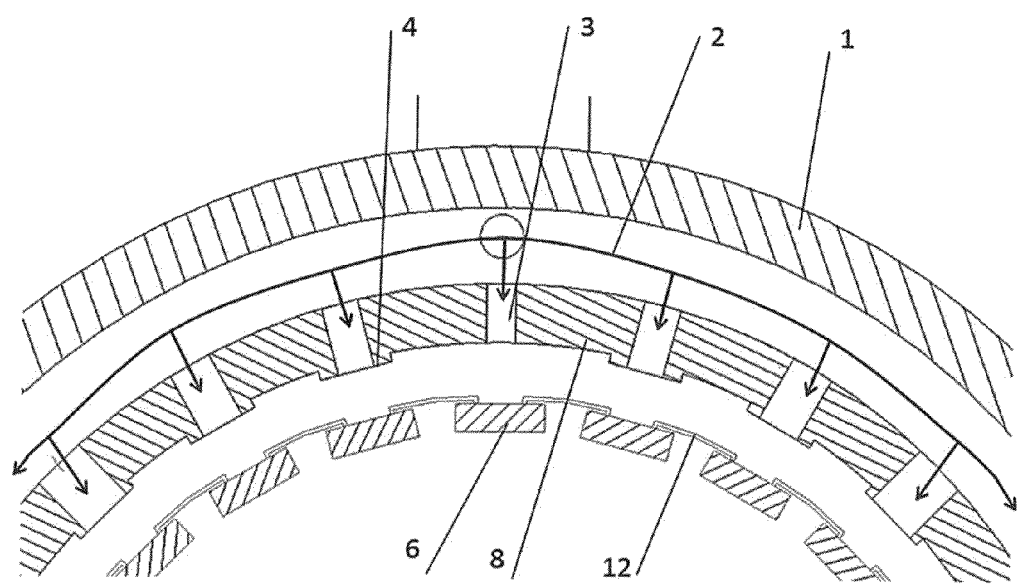
FIG. 12 is a section view, similar to FIG. 5, showing the hole diameters of the oil outlet holes in the stator retainer increase sequentially downward from the top end of the stator retainer.

Referring to FIGS. 5 and 12, a plurality of oil outlet holes (3) are distributed in the circumferential wall of the stator retainer 8, but there is only one oil inlet hole 7 located at the top end of the casing 1. In the prior art, the oil outlet holes 3 have the same size. Consequently, an oil outlet amount of the oil outlet hole 3 at the uppermost top end of the stator retainer 8 is biggest, and sequentially downwards from the top end of the stator retainer 8, oil outlet amounts of the oil outlet holes 3 gradually reduce. As a result, the winding coils are unevenly cooled. Thus, in the embodiment of the present invention, sequentially downwards from the top end of the stator retainer 8, hole diameters of the oil outlet holes 3 increase sequentially so as to ensure that the oil outlet amount of every oil outlet hole 3 is approximately consistent, thereby preventing the reduction of the oil outlet amount of the succeeding oil outlet holes 3 since most of the oil has flowed from one outlet hole 3 to one coil.

Figure 6:
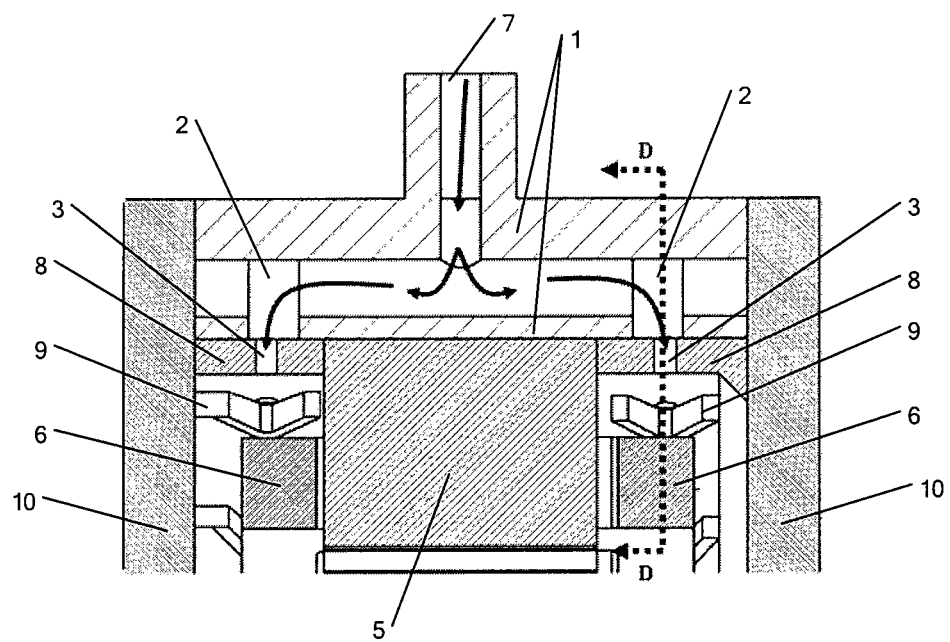
FIG. 6 is a schematic diagram of a second embodiment of the electrical machine in the present invention.

FIG. 6 is a schematic diagram of a second embodiment of the electrical machine in the present invention. FIG. 6 is a sectional view taken along a line AA' shown in FIG. 1. Referring to FIG. 6, the electrical machine comprises: a housing and a stator assembly. Wherein the housing comprises: a casing 1, an oil inlet hole 7, an oil passage 2, oil outlet holes 3, a stator retainer 8 and a casing end cover 10; wherein the oil inlet hole 7 is located in the casing 1, the oil outlet holes 3 are located in the stator retainer 8, and the oil passage 2 is located inside the casing 1 and links with the oil inlet hole 7 and the oil outlet holes 3. The stator assembly comprises: a stator iron core 5, winding coils 6 and slot insulations 12; here, the slot insulations 12 cannot be seen in the sectional view of FIG. 6, but the position thereof will be shown in the succeeding FIG. 8; the oil outlet holes 3 are located above the winding coils 6. The above structure is the same with the prior art.

Figure 7:
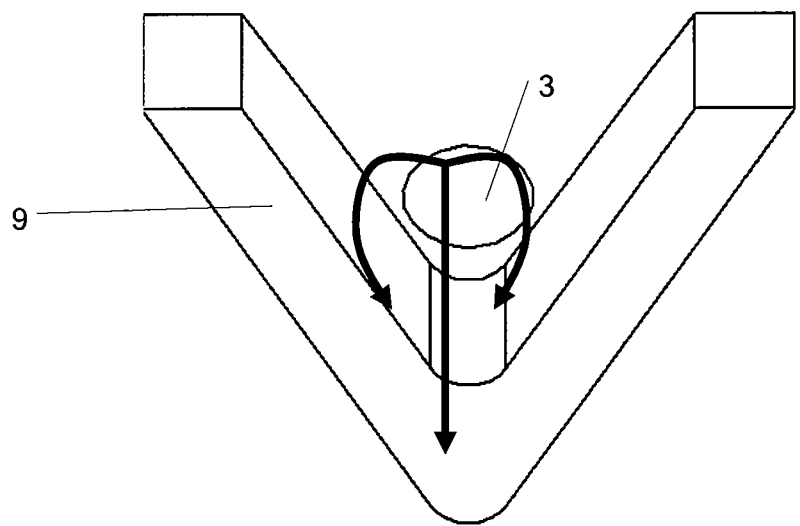
FIG. 7 is a structural schematic view of the V-shaped oil-guides in the embodiment shown in FIG. 6.

In the embodiment of the present invention, the electrical machine shown in FIG. 6 further comprises V-shaped oil-guides 9 located between the oil outlet holes 3 and the winding coils 6. Thus, the cooling oil entering from the oil inlet hole 7 pours directly onto the winding coils 6 by the guiding of the V-shaped oil-guides 9, instead of losing along the circumferential wall of the housing, after flowing through the oil passage 2 and flowing out of the oil outlet holes 3. FIG. 7 is a structural schematic view of the V-shaped oil-guides in the embodiment shown in FIG. 6. FIG. 7 shows the path taken by the cooling oil flowing out of the oil outlet hole 3 flows under the action of the oil-guides 9 indicated by arrows.

In the embodiment shown in FIG. 6, the V-shaped guide steps 9 may be fixed to the stator retainer 8, or, the V-shaped oil-guides 9 may also be casted with the stator retainer 8 as one piece. Here, the stator retainer 8 may be fixed to the casing 1, or, the stator retainer 8 may also be casted with the casing 1 as one piece. In addition, the stator retainer 8 may also be fixed to the casing end cover 10, or, the stator retainer 8 may also be casted with the casing end cover 10 as one piece.

In the embodiment shown in FIG. 6, the oil passage 2 is formed by trenching, drilling, or casting within the casing 1.

Figure 8:
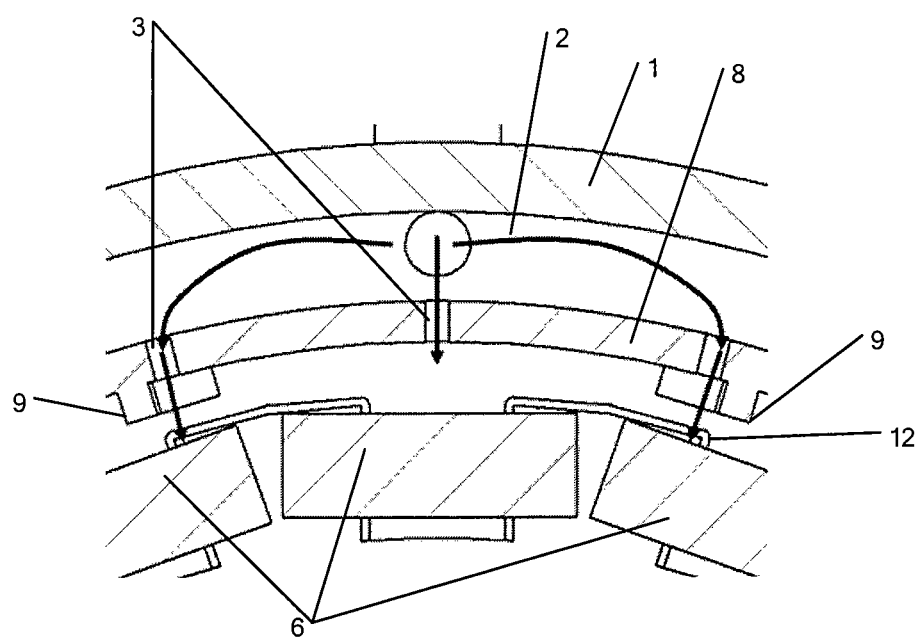
FIG. 8 is a sectional view taken along a line DD' shown in FIG. 6.

FIG. 8 is a sectional view taken along a line DD' shown in FIG. 6. FIG. 8 show the slot insulations 12 that FIG. 6 fails to show, and the path taken by the cooling oil to flow from the oil inlet hole 7 through the oil passage 2 to the oil outlet holes 3 as indicated by arrows and the passage along which the cooling oil flows from the outlet holes 3 through the V-shaped guiding step 9 to the winding coils 6.

Figure 9:
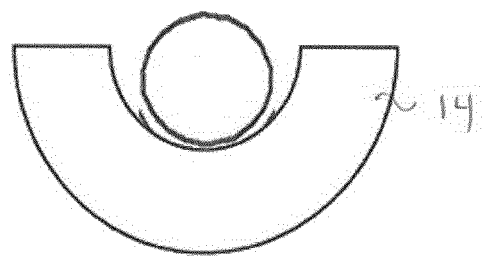
FIG. 9 is a structural schematic view of an alternate embodiment of oil-guide for the electrical machine laving a semicircular configuration.
Figure 10:
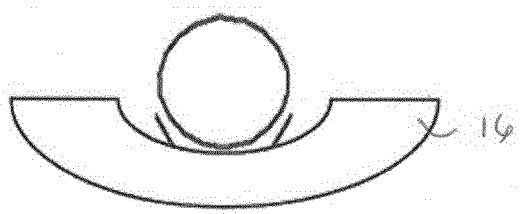
FIG. 10 is a structural schematic view of a further alternate embodiment of an oil-guide for the electrical machine having a semielliptical configuration.
Figure 11:
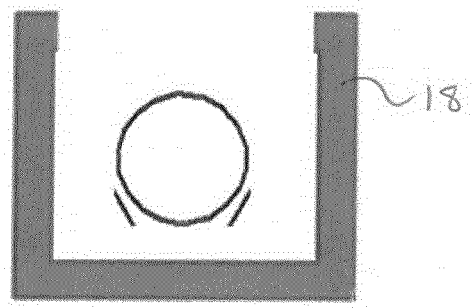
FIG. 11 is a structural schematic view of a still further alternate embodiment of an oil-guide for the electrical machine having a throe-sided rectangular configuration.

The above two embodiments provides cylindrical oil-guides 4 and V-shaped oil-guides 9. In other embodiments of the present invention, the oil-guides may be semicircular 14 (FIG. 9), semi-elliptical 16 (FIG. 10) or three-side rectangular 18 (FIG. 11).

In conclusion, in the existing oil cooling solution for coils of the electrical machine, only one oil outlet hole is drilled in the housing or a number of oil outlet holes are drilled along the circumference, but no oil-guides are provided and mounted. Thus, after the oil flows out of the oil outlet hole(s), most of the oil will lose along the circumferential wall of the housing or the end cover due to surface tension and low pressure of the oil, and fails to directly cool the coils. The technical solution of the present invention, i.e., providing oil-guides between the oil outlet holes and the winding coils of the electrical machine, and guiding the cooling oil flowing out of the oil outlet holes by the oil-guides to pour onto the winding coils when the cooling oil enters from the oil inlet hole, flows through the oil passage and then flows out of the oil outlet holes, avoids the loss of the cooling oil along the circumferential wall of the housing and the casing end cover due to surface tension after the cooling oil flows out of the oil outlet holes, and allows the cooling oil to pour directly onto the winding coils such that the winding coils can be evenly cooled. This greatly enhances the cooling efficiency of the winding coils of the electrical machine, thereby improving the thermal durability of the electrical machine.

The above are provided only as the preferred embodiments of the present invention but not intended to limit the present invention. Any amendment, equivalent substitution and improvement and the like within the spirit and essence of the present invention shall be included in the protection scope of the present invention.

The invention claimed is:

1. An electrical machine, comprising:
   a housing including a casing (1), an oil inlet hole (7), an oil passage (2), oil outlet holes (3), a stator retainer (8) and a casing end cover (10), the oil inlet hole (7) being located in the casing (1), the oil outlet holes (3) being located in the stator retainer (8), and the oil passage (2) being located inside the casing (1) and links with the oil inlet hole (7) and the oil outlet holes (3);
   a stator assembly including a stator iron core (5), winding coils (6) and slot insulations (12), the oil outlet holes (3) being located above the winding coils (6); and
   oil-guides located between the oil outlet holes (3) and the winding coils (6), the oil-guides being configured to receive cooling oil from the oil outlet holes (3) and pour the cooling oil onto the winding coils (6) in a flow;
   wherein the cooling oil sequentially enters the oil inlet hole (7), flows through the oil passage and out of the oil outlet holes (3), is guided through the oil-guides, and pours onto the winding coils (6).

2. The electrical machine according to claim 1, characterized in that
   the oil-guides are fixed to the stator retainer (8).

3. The electrical machine according to claim 1, characterized in that
   the stator retainer (8) is fixed to the casing (1).

4. The electrical machine according to claim 1, characterized in that
   the shape of the oil-guides is selected from a group including cylindrical, V-shaped, semicircular, semi-elliptical, or three-side rectangular.

5. The electrical machine according to claim 1 characterized in that the plurality of oil outlet holes (3) are distributed in a circumferential wall of the stator retainer (8), and wherein:
   the oil outlet holes have hole diameters; and
   sequentially downwards from a top end of the stator retainer (8), the hole diameters of the oil outlet holes (3) increase sequentially.

6. The electrical machine according to claim 1, characterized in that the stator retainer (8) is fixed to the casing end cover (10).

7. An oil cooling method for electrical machine, which is suitable for the electrical machine, comprising the steps of:
   providing a housing including a casing (1), an oil inlet hole (7), an oil passage (2), oil outlet holes (3), a stator retainer (8) and a easing end cover (10), the oil inlet hole (7) being located in the casing (1), the oil outlet holes (3) being located in the stator retainer (8), and the oil passage (2) being located inside the casing (1) and links with the oil inlet hole (7) and the oil outlet holes (3);
   providing a stator assembly including a stator iron core (5), winding coils (6) and slot insulations (12), the oil outlet holes (3) being located above the winding coils (6);
   providing oil-guides between the oil outlet holes (3) and the winding coils (6), the oil-guides being configured to receive cooling oil from the oil outlet holes (3) and pour the cooling oil onto the winding coils (6) in a flow; and guiding the cooling oil flowing out of the oil outlet holes (3) with the oil guides to pour onto the winding coils (6) in a flow;

wherein the cooling oil enters from the oil inlet hole (7), flows through the oil passage (2) and then flows out of the oil outlet holes (3).

8. The method according to claim 7, characterized by the additional step of fixing the oil-guides to the stator retainer (8).

9. The method according to claim 7, characterized by the additional step of fixing the stator retainer (8) to the casing (1).

10. The method according to claim 7, characterized in that the shape of the oil-guides is selected from the group including cylindrical, V-shaped, semicircular, semi-elliptical, or three-side rectangular.

11. The method according to claim 7, characterized by the additional step of distributing a number of oil outlet holes (3) in the circumferential wall of the stator retainer (8), the oil outlet holes having hole diameters, wherein sequentially downwards from a top end of the stator retainer (8), the hole diameters of the oil outlet holes (3) increase sequentially.

12. The method according to claim 7, characterized by the additional step of fixing the stator retainer (8) to the casing end cover (10).

* * * * *